US011574150B1

(12) United States Patent
Sharma et al.

(10) Patent No.: US 11,574,150 B1
(45) Date of Patent: Feb. 7, 2023

(54) DATA INTERPRETATION ANALYSIS

(71) Applicant: Wells Fargo Bank, N.A., San Francisco, CA (US)

(72) Inventors: Pranshu Sharma, New Delhi (IN); Srimoyee Duttagupta, Bangalore (IN); Naveen Gururaja Yeri, Bangalore (IN); Hemalatha AC, Bangalore (IN); Dipan Banerjee, Bangalore (IN); Alan On Yau, Tustin, CA (US); Michelle Sunna Nowe, South Pasadena, CA (US); Manesh Saini, New York City, NY (US); Hasan Adem Yilmaz, San Diego, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 517 days.

(21) Appl. No.: 16/687,198

(22) Filed: Nov. 18, 2019

(51) Int. Cl.
*G06K 9/62* (2022.01)
*G06F 16/2452* (2019.01)
(Continued)

(52) U.S. Cl.
CPC ..... *G06K 9/6265* (2013.01); *G06F 16/24522* (2019.01); *G06K 9/6227* (2013.01); *G06K 9/6284* (2013.01); *G06N 20/00* (2019.01); *G06V 10/764* (2022.01); *G06V 10/7796* (2022.01); *G06V 10/87* (2022.01); *G06V 30/19113* (2022.01); *G06V 30/19167* (2022.01); *G06V 30/19173* (2022.01); *G06Q 40/00* (2013.01); *G06V 2201/10* (2022.01)

(58) Field of Classification Search
None
See application file for complete search history.

(56) References Cited

U.S. PATENT DOCUMENTS 5,832,465 A 11/1998 Tom
6,951,008 B2 9/2005 Quaile
(Continued)

OTHER PUBLICATIONS

Hussein, Doaa Mohey El-Din Mohamed. "A survey on sentiment analysis challenges." Journal of King Saud University-Engineering Sciences 30.4 (Oct. 2018): 330-338. (Year: 2018).*

(Continued)

*Primary Examiner* — Emily C Terrell
*Assistant Examiner* — Nathan J Bloom
(74) *Attorney, Agent, or Firm* — Kilpatrick Townsend & Stockton LLP

(57) ABSTRACT

Quality associated with an interpretation of data captured as unstructured data can be determined. Attributes can be identified within the unstructured data automatically. Subsequently, sentiment associated with each of the attributes can be determined based on the unstructured data. Correctness of the unstructured data, and thus the interpretation, can be assessed based on a comparison of the attribute and associated sentiment with structured data. A quality score can be generated that captures the quality of the data interpretation in terms of correctness and as well as results of another analysis including completeness, among others. Comparison of the quality score to a threshold can dictate whether or not the interpretation is subject to further review.

18 Claims, 10 Drawing Sheets

(51) Int. Cl.
  *G06N 20/00* (2019.01)
  *G06V 30/19* (2022.01)
  *G06V 10/778* (2022.01)
  *G06V 10/70* (2022.01)
  *G06V 10/764* (2022.01)
  *G06Q 40/00* (2012.01)

(56) References Cited

U.S. PATENT DOCUMENTS

| | | | |
|---|---|---|---|
| 7,895,062 | B2 | 2/2011 | Bonissone et al. |
| 7,899,688 | B2 | 3/2011 | Bonissone et al. |
| 8,271,307 | B2 | 9/2012 | Butcher et al. |
| 9,684,634 | B2 | 6/2017 | Dong et al. |
| 10,740,553 | B2 * | 8/2020 | Mullins ............... G06Q 10/101 |
| 2004/0172317 | A1 | 9/2004 | Davis et al. |
| 2010/0023311 | A1 * | 1/2010 | Subrahmanian ...... G06F 16/345 707/E17.109 |
| 2013/0006845 | A1 | 1/2013 | Kremen |
| 2014/0164302 | A1 * | 6/2014 | Di Fabbrizio ........... G06N 5/02 706/46 |
| 2014/0289098 | A1 | 9/2014 | Walzak |
| 2015/0032598 | A1 | 1/2015 | Fleming et al. |
| 2015/0193883 | A1 | 7/2015 | Sullins et al. |
| 2015/0294406 | A1 | 10/2015 | Dixon et al. |
| 2015/0339769 | A1 | 11/2015 | deOliveira et al. |
| 2018/0032870 | A1 | 2/2018 | Liu et al. |
| 2018/0114142 | A1 | 4/2018 | Mueller |
| 2018/0165768 | A1 | 6/2018 | Unsworth et al. |
| 2019/0378179 | A1 * | 12/2019 | Cleverley ............. G06Q 50/01 |
| 2021/0019339 | A1 * | 1/2021 | Ghulati ................. G06Q 50/00 |

OTHER PUBLICATIONS

Yue, Lin, et al. "A survey of sentiment analysis in social media." Knowledge and Information Systems 60.2 (Aug. 2019): 617-663. (Year: 2019).*

Birjali M, Kash M, Beni-Hssane A. A comprehensive survey on sentiment analysis: Approaches, challenges and trends. Knowledge-Based Systems. Aug. 17, 2021;226:107134. (Year: 2021).*

Mylavarapu, S. S. G. S. (2020). "Context-aware quality assessment of structured and unstructured data", Retrieved from https://www.proquest.com/dissertations-theses/context-aware-quality-assessment-structured/docview/2493158720 (Year: 2020).*

Kazmaier J, van Vuuren JH. A generic framework for sentiment analysis: Leveraging opinion-bearing data to inform decision making. Decision Support Systems. Aug. 1, 2020;135:113304. (Year: 2020).*

Wiebe J, Wilson T, Bruce R, Bell M, Martin M. Learning subjective language. Computational linguistics. Sep. 1, 2004;30(3):277-308. (Year: 2004).*

* cited by examiner

FIG. 5A

| APP_SID | COMMENT | app_history | bankruptcy | loss | collateral | credit_history | payment_to_inc | debt_to_inc | disposable_inc | disposable_inc_ratio | loan_amount | loan_to_value | payment_to_inc | revolving_debt_term | risk | the_ability_to_pay |
|---|---|---|---|---|---|---|---|---|---|---|---|---|---|---|---|---|
| 976072283 | risk is waived interview, disposable income debt ratio pti, risk is offset with prior auto history, cutting back due to income and pti | 3 | 0 | 0 | 0 | 0 | 0 | 1 | 1 | 0 | 0 | 0 | 0 | 0 | 0 | 0 |

FIG. 5B

| APP_SID | Preprocess | payment_to_inc | debt_to_inc | disposable_inc | disposable_inc_ratio | auto_history | SENTIMENT | Total_Attributes | Attributes_Strength | Attribute_Risk |
|---|---|---|---|---|---|---|---|---|---|---|
| 976072283 | risk is waived interview, disposable income debt ratio pti, risk is offset with prior auto history, cutting back due to income and pti | -1 | -1 | -1 | 1 | 1 | -2 | 4 | 1 | 3 |

FIG. 5C

| APP_SID | Preprocess | APPRVD_AMT | APP_DEBT_RATIO | APP_DISPOS_INCOME | APP_PTI | STRUCTURED_VAR | AVAILABLE_ATTRIBUTE | MATCHED | ACCURACY |
|---|---|---|---|---|---|---|---|---|---|
| 976072283 | risk is waived interview, disposable income debt ratio pti, risk is offset with prior auto history, cutting back due to income and pti | 32676.00000 | 30.400000 | 2224.7300 | 8.400000 | | | 3 | 0.750 |

DATA INTERPRETATION ANALYSIS

BACKGROUND

Underwriting is a process in which an entity assumes a financial risk for a fee. For example, a financial institution that loans money to an individual collects interest on the loan and takes on the risk that the individual will not repay the loan. In another example, a company can charge an entity a premium for assuming the risk associated with insuring people and assets.

Underwriters are individuals who assess risk associated with an applicant for a loan or insurance, for instance. An underwriter decides whether to approve or decline an application based on risk assessment. For example, an application with acceptable risk can be approved while an application with unacceptable risk can be declined. Underwriters consider a number of different attributes to make a risk assessment. Underwriters justify their decision to approve or decline an application in a comment that references a set of attributes. Review of underwriter performance conventionally involves comparing fees collected versus losses incurred as well as evaluating the speed of processing.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to data interpretation analysis. Data is subject to interpretation, which can be captured as an unstructured comment. To enable analysis, an unstructured comment or interpretation can be processed. Attributes can be automatically identified from the interpretation, and sentiment analysis can be performed to classify the sentiment of each identified attribute. Subsequently, analysis can be performed to determine the quality of the data interpretation. The analysis can include determining the accuracy of the interpretation by comparing attribute values to values specified in the data. Further, sentiment of each attribute can be computed from the data and compared with the sentiment determined from the interpretation. The result of the comparisons can be indicative of correctness of the data interpretation. A measure of correctness, alone or in combination with results of other analysis, for example of completeness, can be utilized to generate and report a score capturing the quality of the interpretation. Further review of the data interpretation can be triggered or withheld based on the score in relation to a quality threshold.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

BRIEF DESCRIPTION OF THE DRAWINGS

FIGS. 5A-C illustrate tables associated with an example scenario.

FIGS. 6A-C depict tables associated with an example scenario.

DETAILED DESCRIPTION

Underwriters support their decision to approve or decline an application in a comment. The comment, for instance in a comment field, can reference a set of attributes, such as credit attributes, that allegedly justify a decision regarding an application. Moreover, the comment can be specified as free-form text, or in other words, in unstructured data. Since the comment is unstructured, the quality of an underwriter's decision, and more particularly the justification expressed in the comments, is not subject to oversight and evaluation, which is problematic for quality assurance purposes.

Details provided herein generally pertain to data interpretation analysis. Data interpretation can be specified in an unstructured, or free-form, format. Attributes within the unstructured data interpretation can be identified, for example by text-based pattern matching. The sentiment of the attributes can be determined based on context from the unstructured data. The sentiment can capture an attitude with respect to an attribute, such as positive, negative, or neutral. Attributes can be computed, for example, based on structured data. Subsequently, the accuracy of the attributes identified from the data interpretation is determined by comparing the value of the attributes identified from the data interpretation to the attributes computed from the structured data. Further, the sentiment of an attribute can be evaluated for correctness, for instance by comparison with structured data. Furthermore, quantity of attributes in the data interpretation can be computed and compared with a predetermined threshold to measure completeness, for instance. Subsequently, one or more scores can be computed to represent the quality of the data interpretation based on the results of the analysis. Actions can be taken or not based on comparison of the one or more scores. For instance, if the score is below an acceptable threshold value accuracy, the comment can be flagged for further review.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
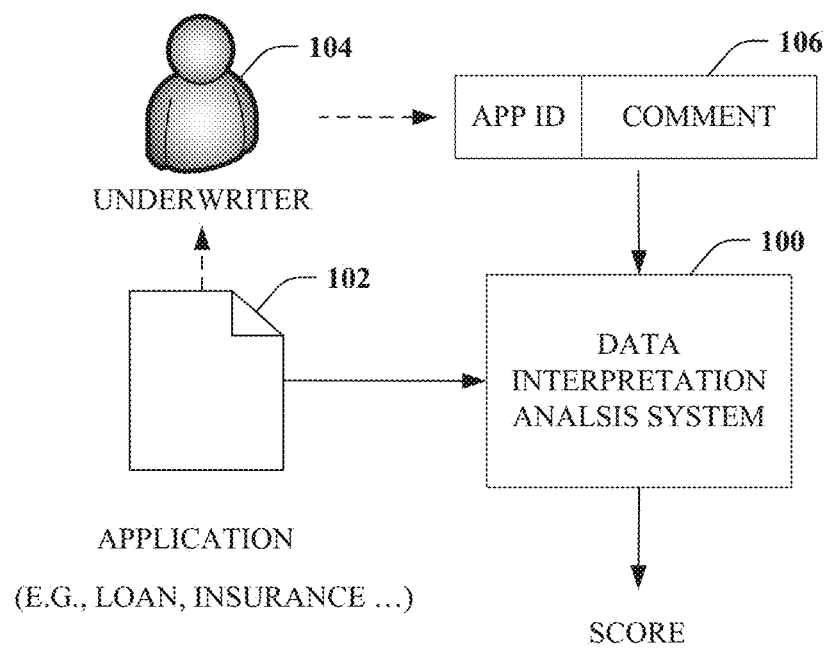
FIG. 1 illustrates an overview of an example implementation.

Referring initially to FIG. 1, an overview of an example implementation is illustrated and described. As depicted, the implementation includes data interpretation analysis system 100 that receives input from application 102, and comment 106 specified by underwriter 104. The output of the data interpretation analysis system 100 is a score that represents the quality of decision of the underwriter 104. If the score does not meet a predetermined threshold, the comments 106 can be flagged for further quality assessment review.

The application 102 captures a formal request, for example for a loan or insurance. The application includes data specified by a user. For example, a user can complete an online application for a loan or insurance including pertinent information such as name, address, age, income, or prior health issues, among other data solicited by the application. The data captured by the application can be stored as structured data. Structured data is organized in accordance with a data model that defines data fields, data types, and optional restrictions. For example, data from an application can be stored in database or spreadsheet fields corresponding to name, birth date, and income. The organized nature of structured data enables such data to be easily queried and analyzed.

The underwriter 104 is an individual, or alternatively an automated bot, that reviews the application 102 and makes a decision regarding acceptance or approval of the application. For example, the underwriter 104 can analyze application data to determine risk associated with approving a loan or insurance policy. In the context of a loan, the underwriter may be concerned with credit factors or attributes such as payment to income ratio and disposable income. The underwriter 104 makes a decision and justifies the decision in the comment 106 associated with the application 102.

The comment 106 can be entered free-form and lack structure. In this way, the underwriter 104 is not constrained in how decisions are discussed and justified. However, unlike structured data, unstructured data of comments 106 is not suitable for analysis. Consider for example, comment 106 associated with an automobile loan decision as follows: "risk on deal is prey bk, age of collateral, ok with disp>2k with pti and dr inline." In other words, this risk associated with approving the loan is a previous bankruptcy and the age of the automobile as collateral, but the individual's disposable income is greater than two thousand dollars with payment to income and debt ratios in line with what is acceptable. However, this meaning is not readily apparent in this form.

The data interpretation analysis system 100 receives the unstructured comment 106 as input and produces a score representing the quality of the decision justification. In furtherance thereof, the system 100 executes functionality to identify attributes and determine underwriter sentiment with respect to these attributes. Subsequently, data regarding the identified attributes can be acquired from the application. The data can be utilized to determine the accuracy of an attribute value and sentiment. For example, if a disposable income attribute indicates an amount greater than $2,000 as a strength, but data from the application indicates that the amount is under $1,000, which could be a risk, the correctness or quality of the comments 106 is negatively scored in that regard. Further, the number of attributes mentioned in the comments can be compared to a threshold number associated with a completeness measure. The overall score of the comments reflects the quality of the comments 106 with respect to correctness and completeness. The score can be numeric (e.g., 1-10), alphabetic (e.g., A-F), or some other representation. If the score does not satisfy a predetermined threshold for acceptable quality, the corresponding comments 106 can be flagged for subsequent review by an individual or automated system.

Figure 2:
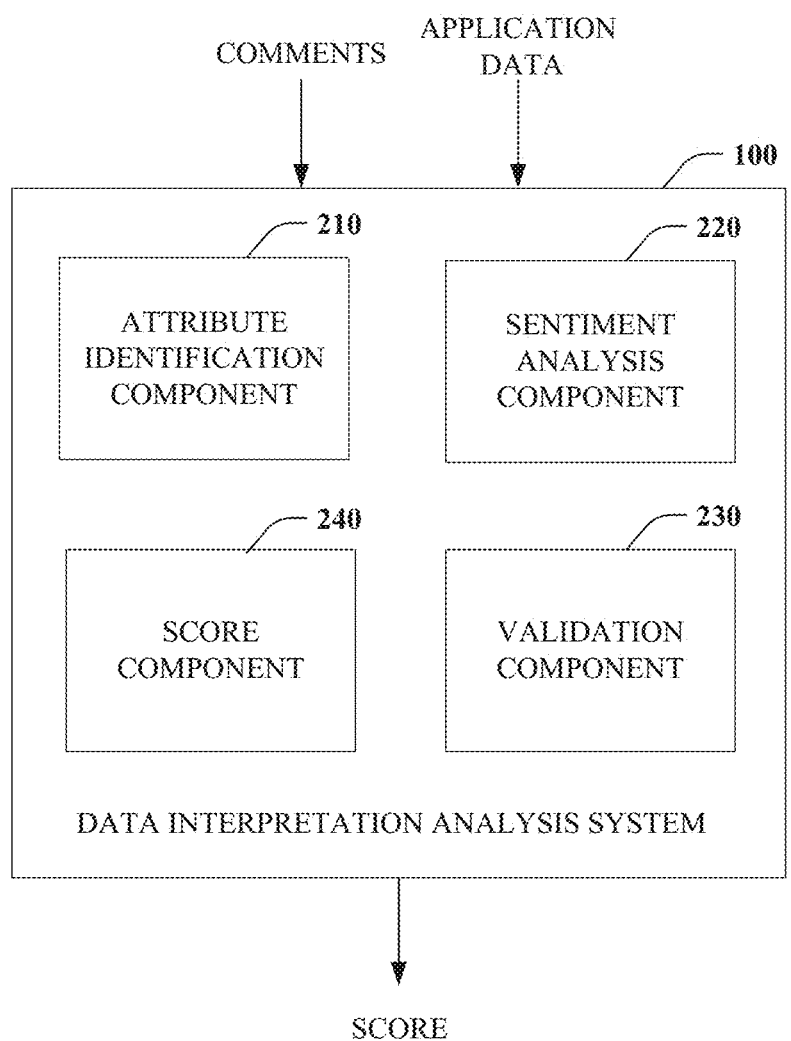
FIG. 2 is a schematic block diagram of a data interpretation analysis system.

Turning attention to FIG. 2, the data interpretation analysis system 100 is depicted in further detail. As depicted, the system 100 can receive comments and application data as input and produce a quality score as output. The system 100 includes attribute identification component 210, sentiment analysis component 220, validation component 230, and score component 240. The attribute identification component 210 is configured to identify various attributes or factors specified in an unstructured comment. In accordance with one embodiment, the attribute identification component 210 can execute pattern recognition functionality including, for example, use of regular expressions.

Figure 3:
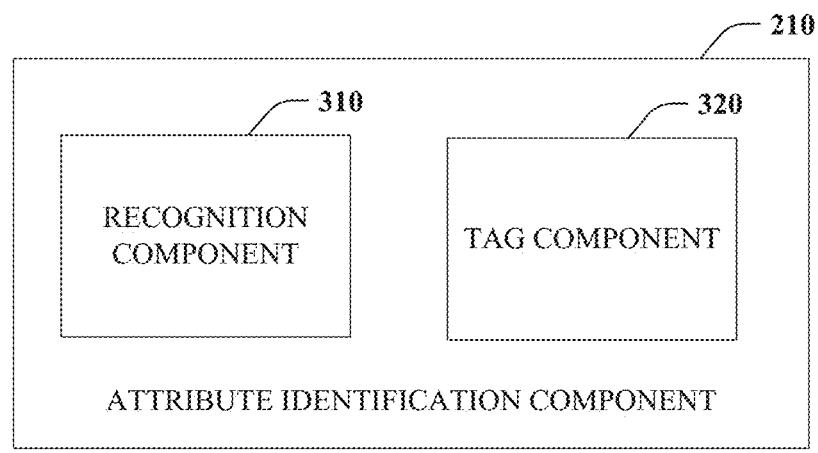
FIG. 3 is a schematic block diagram of a sample attribute identification component.

Turning briefly to FIG. 3, a sample attribute identification component 210 is illustrated in further detail. Here, the attribute identification component 210 includes recognition component 310 and tag component 320. The recognition component 310 is configured to text mine the comment 106 to identify attributes associated with interpretation of data including decision justification. The tag component 320 can tag any identified attribute with a corresponding label capturing the attribute. In one instance, the recognition component 310 can seek to recognize credit attributes in the comment 106 and the tag the recognized attributes accordingly. For example, if the comment 106 notes "risk—pti over 40%, d/i under 1k," the recognition component can identify two attributes "pti" and "d/i" and the tag component 320 can tag them as payment to income and disposable income, respectively. These attributes can be identified by text matching predetermined attributes and variations thereof. In one instance, machine learning in conjunction with natural language processing and text analysis can be employed to learn and classify attributes in a text comment.

Returning to FIG. 2, the sentiment analysis component 220 is configured to determine the sentiment associated with each discovered attribute in the comments 106. In other words, the attitude of a writer toward each particular attribute in comments 106 can be determined. The attitude could be positive, negative or neutral. The sentiment analysis component 220 can employ natural language processing and text analysis to computationally identify and extract subjective information related to attributes. In the prior example comment 106 noting "risk—pti over 40%, d/i under 1k," the sentiment analysis component 220 can determine that "risk —" indicates that payment to income and disposable income attributes are both risks, or in other words have a negative sentiment, for example with respect to application approval. As another example, suppose comment 106 notes "risk on deal is previous bk, ok with disp>2k and pti." After the attributes are identified and tagged, the modified comment would be "risk on deal is previous bankruptcy, ok with disposable income and payment to income." Here, the sentiment analysis component 220 can determine that sentiment associated with bankruptcy is negative and the sentiment associated with disposable income and payment to income is positive. The meaning positive and negative sentiment can be context dependent. With respect to an underwriter for a financial institution, for example, the positive sentiment can correspond to strength and negative sentiment can denote risk.

Figure 4:
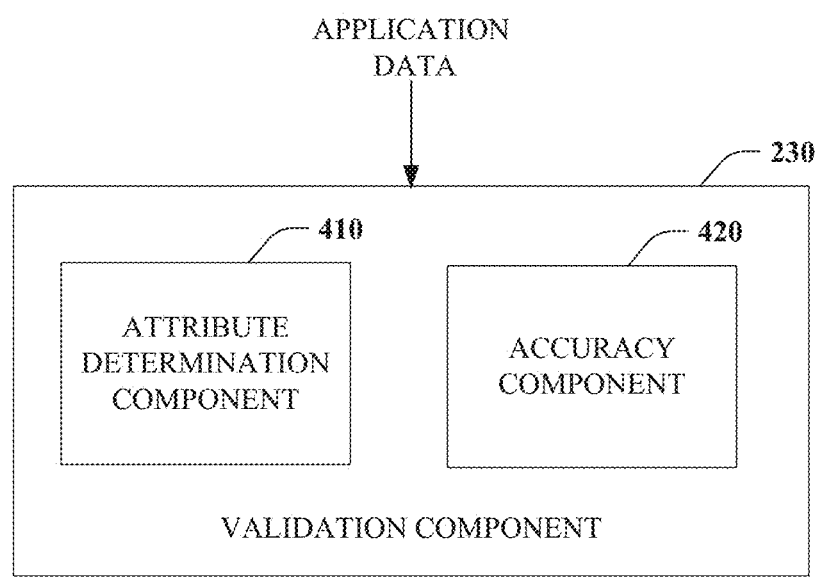
FIG. 4 is a schematic block diagram of a sample validation component.

The validation component 230 is configured to determine the correctness or accuracy of a comment 106 based on the identified attributes and associated sentiment. Referring to FIG. 4, a sample validation component 230 is illustrated in further detail. The validation component 230 includes attribute determination component 410 and accuracy component 420. The attribute determination component 410 accesses the application data and determines attributes. In one instance, determination can correspond to mere identification of presence or absence of an attribute. For instance, a determination of whether or not a bankruptcy is present can be performed. In another instance, determination can involve computing attribute values from the data. For example, a debt to income ratio can be computed based on determination of debt and income indicated in the application. The accuracy component 420 can be configured to determine the accuracy or correctness of attributes present in a comment and those identified by the attribute determination component 410 directly from the application. By way of example, if a comment includes disposable income is greater than two thousand dollars, the accuracy component 420 assesses whether or not the application supports that contention.

In addition to determining the accuracy of the input data, the sentiment can be considered. More specifically, the attribute determination component can not only determine the value of an attribute but also the associated sentiment of an attribute. In one instance, the sentiment can be determined based on comparison to known thresholds. Consider, for instance, a disposable income attribute. In this case, the amount of disposable income can be compared to a threshold such as one thousand dollars, wherein a disposable income greater than or equal to the threshold can be deemed positive sentiment, or a strength, and disposable income less than the threshold can be deemed negative sentiment, or a risk. The determined sentiment for the attribute can then be compared by the accuracy component 420 to determine whether the sentiment associated with the attribute in the comment is consistent with the sentiment for the attribute determined from structured data of an application for example. If the sentiment is consistent, or matching, the sentiment is determined to be accurate. Otherwise, the sentiment can be deemed inaccurate.

The validation component 230 can also be configured to compare a decision or judgement made based on data with comments specified regarding the data. For instance, approval or denial of a loan application can be compared with comments allegedly supporting the approval or denial. If comments are aligned with the decision, the decision can be said to be valid. Alternatively, if comments are not aligned with the decision, the decision can be said to be invalid or requiring further assessment. In accordance with one embodiment, this can be accomplished by determining an overall sentiment of a comment considering the sentiment of each attribute in the comment and comparing the overall sentiment to the decision to determine alignment. Consider, for example, a decision to approve a loan with comments that identify only negative sentiment, or risks, of an application with no positive sentiment, or strengths. In this case, there is misalignment of the decision with the comments, which may need to be analyzed further to ensure the decision was not a mistake. In accordance with one embodiment, positive sentiment can be captured as positive one and negative sentiment as negative one. The overall sentiment can be computed by adding the integer values of the individual sentiments for each attribute. The sign of the sum can capture the overall sentiment and the numeric value can denote the extent of the sentiment, which can be considered in validating the decision or flagging the decision for further review.

Returning to FIG. 2, the score component 240 can receive input from validation component 230 based upon which a score can be generated. The score component 240 can represent data interpretation quality associated with data, such as that provided in an application. Quality can be measured in terms of correctness or accuracy, and completeness. The score can be embodied as a number (e.g. 1-10) or letter (e.g., A-F), or other representation. The score can be provided alone or accompanied by additional information to aid in understanding the score. In one instance, a key can be provided to aid understanding of the meaning of score. In another instance, the score can be provided with information regarding detected correctness issues, for example by highlighting potentially problematic portions of a comment.

To facilitate clarity and understanding with respect to data interpretation analysis, a few example scenarios will be presented in conjunction with FIGS. 5A-C and FIGS. 6A-C. The scenarios and particular implementation discussed are not meant to be limiting. Other scenarios and implementations are possible and contemplated.

As a first example scenario, consider an auto loan application that includes a comment such as "risk is waived interview, disposable income debt ratio, pti, risk is offset with prior auto history, cutting back due to income and pti." The attribute identification component 210 can analyze the comment and identify credit attributes in the comment. FIG. 5A shows a table including an application identifier 500 and comment 510. Further, the table includes potential credit attributes 520. The attribute identification component 210 can utilize text pattern matching to identify which of the potential credit attributes 520 are present in the comment 510. Here, the identified credit attributes are auto history, debt to income ratio, disposable income, and payment to income ratio, which are marked with a number one in each corresponding column of the potential credit attributes 520.

The sentiment analysis component 220 can determine the sentiment for each credit attribute in the comment as determined by the attribute identification component 210. The sentiment is determined from the perspective of an underwriter such that a negative sentiment corresponds to a risk factor and positive sentiment corresponds to a strength factor associated with offering a loan. Utilizing natural language processing and text analysis the sentiment analysis component 220 can determine that attributes following the phrase "risk is" have a negative sentiment, and attributes following the phrase "risk is offset" have a positive sentiment. In FIG. 5B, sentiment is captured in sentiment columns 530 in which negative sentiment is denoted with a negative number and positive sentiment is captured with a positive number. Here, each attribute with a negative sentiment has a negative one in a corresponding column and each attribute with a positive sentiment has a positive one in a corresponding column. In this case, payment to income ratio, debt to income ratio and disposable income all have a negative sentiment while auto history has a positive sentiment. A column is also associated with overall sentiment which is captured by summing the sentiment of each attribute. The overall sentiment can be useful in validating a decision to approve or deny the application. Additional information can include the total number of attributes and the number of attributes that are a strength and the number of attributes that are a risk, which can further inform a decision on scoring data interpretation quality.

Next the validation component 230 can determine attributes from the corresponding application and perform a comparison to determine the accuracy of the comment 510. From application data, the debt to income ratio, disposable income, and payment to income ratio are computed and compared to predetermined thresholds to determine what the sentiment should be. Based on these computations, a comparison is performed between what the sentiment should be based on the application and what the sentiment is determined to be from the comments. Any discrepancies can be deemed inaccurate representations. Turning to FIG. 5C, validation columns 540 capture computation of attributes and the comparison. Here, none of the sentiments matched and thus the comment receives an accuracy score of zero.

Figures 6A, 6B, 6C:
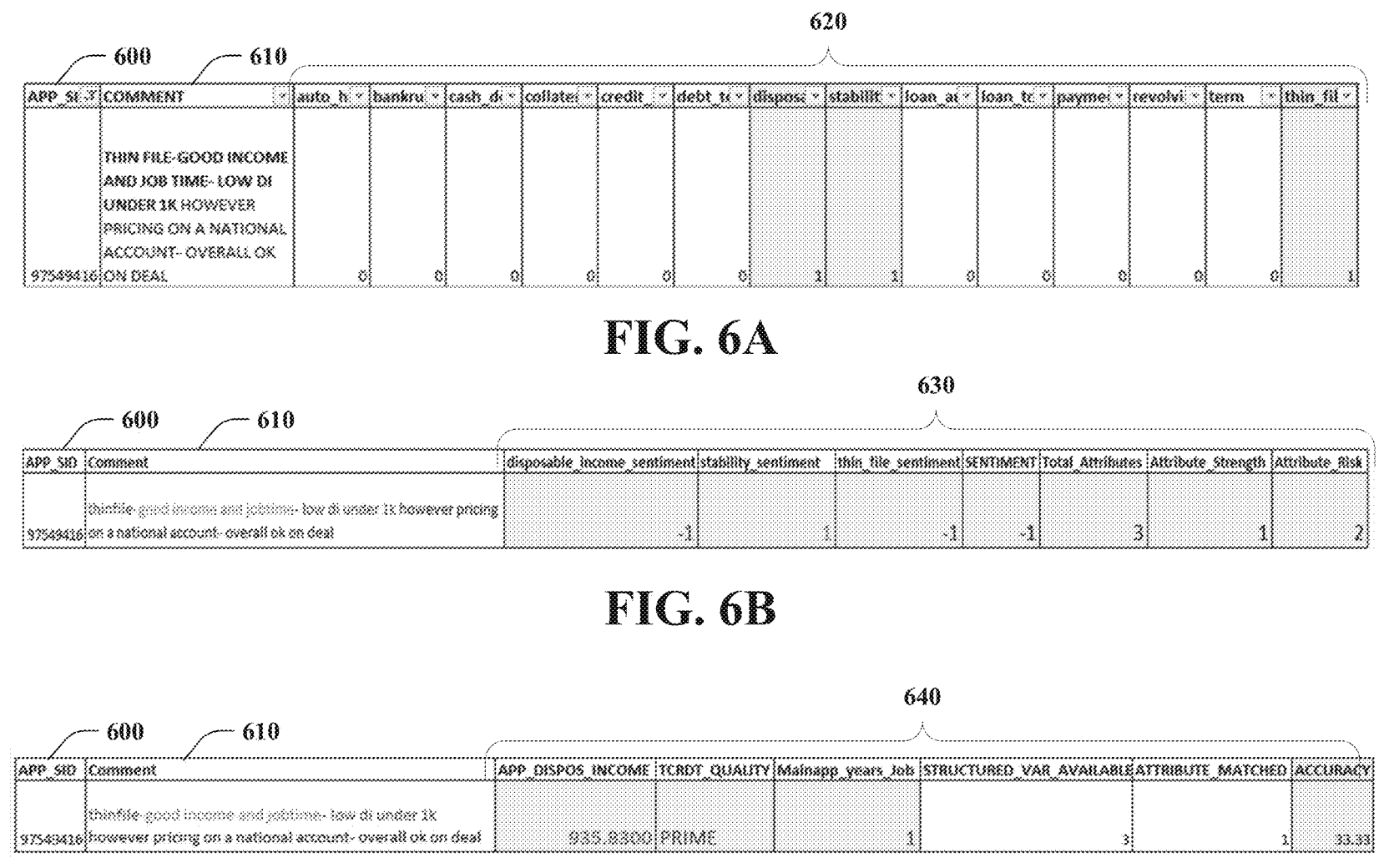

As a second example, consider another auto loan application that includes a comment such as "thin file—good income and job time—low DI under 1K However pricing on a national account—overall ok on deal." The attribute identification component 210 can analyze the comment to identify credit attributes, namely thin file, disposable income and stability. FIG. 6A illustrates a table comprising an application identifier 600 and comment 610. Further, the table includes columns for potential credit attributes 620. Here, a one is added to a column of a row for an identified credit attribute and a zero is added otherwise. The identified attributes are therefore disposable income, stability, and thin file.

Next, the sentiment analysis component 220 can determine the sentiment or attitude associated with identified attributes. This can be accomplished by analyzing the text of the comments and utilizing surrounding text as context for each attribute. Based on the analysis, the sentiment can be negative for disposable income and thin file but positive for stability. FIG. 6B shows a table comprising application identifier 600, comment 610, and sentiment analysis results 630. More particularly, the sentiment analysis results 630 sets a negative one for each attribute with a negative sentiment, meaning it weighs against approval of the auto loan application, and a positive one for each attribute with a positive sentiment, meaning it weighs in favor of approval of the auto loan application. Overall sentiment, total attributes, total strength attributes, and total risk attributes are also computed and shown in sentiment analysis results 630.

The validation component 230 can subsequently determine attributes from application data and perform a comparison to determine correctness of the comment 610. As shown in FIG. 6C, validation results 640 are shown in a plurality of fields. From application data, credit attributes can be determined and compared with predetermined thresholds to determine what the sentiment should be for the attributes. It can be determined from the application data that disposable income is much larger than threshold of one thousand dollars indicative of positive sentiment. The computed stability and thin file attributes both correspond to a negative sentiment when compared with relevant thresholds or the like. Compared to the sentiment extracted for attributes from the comment, a discrepancy is determined between disposable income and stability when the sentiment matched with respect to thin file. Accordingly, the total correctness or accuracy of the comment is one out of three or 33%. This accuracy percentage alone or in combination with results from other analyses (e.g., completeness, decision . . . ) can be utilized by the score component 240 to output an score The aforementioned systems, architectures, platforms, environments, or the like have been described with respect to interaction between several components. It should be appreciated that such systems and components can include those components or sub-components specified therein, some of the specified components or sub-components, and/ or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, such mechanisms can be utilized by attribute identification component 210 and sentiment analysis component 220 in conjunction with text analysis and sentiment determination.

Figure 7:
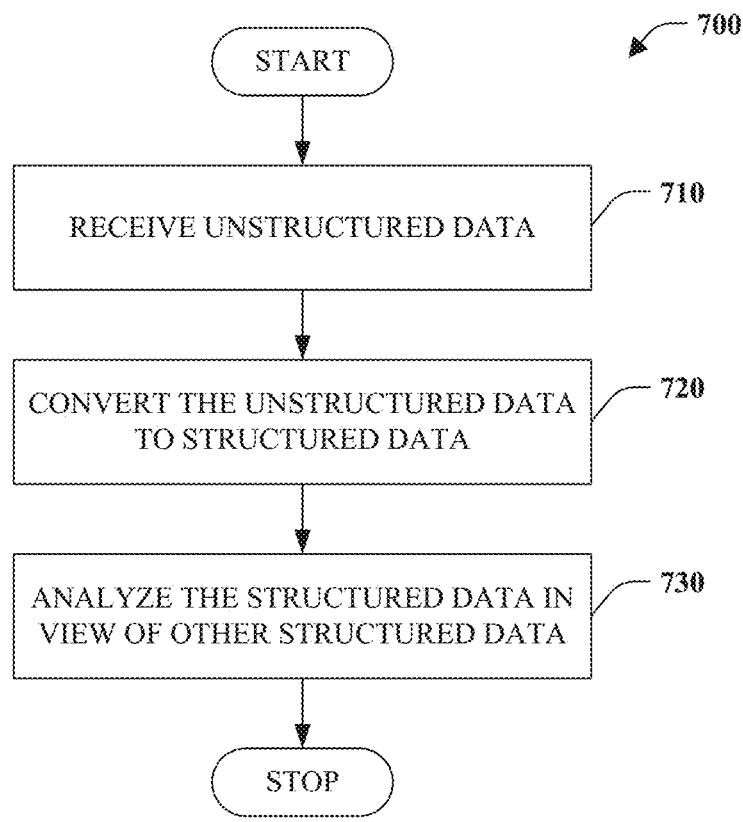
FIG. 7 is a flow chart diagram of a method of data interpretation analysis.
Figure 8:
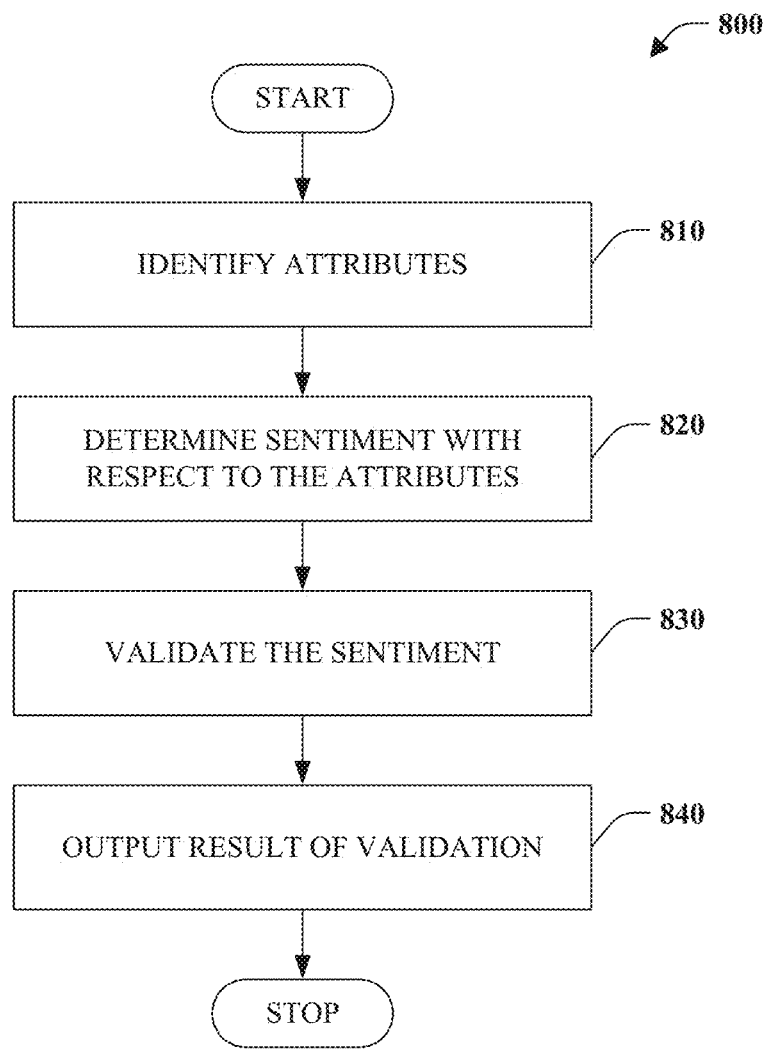
FIG. 8 is a flow chart diagram of a method of assessing accuracy of unstructured data.
Figure 9:
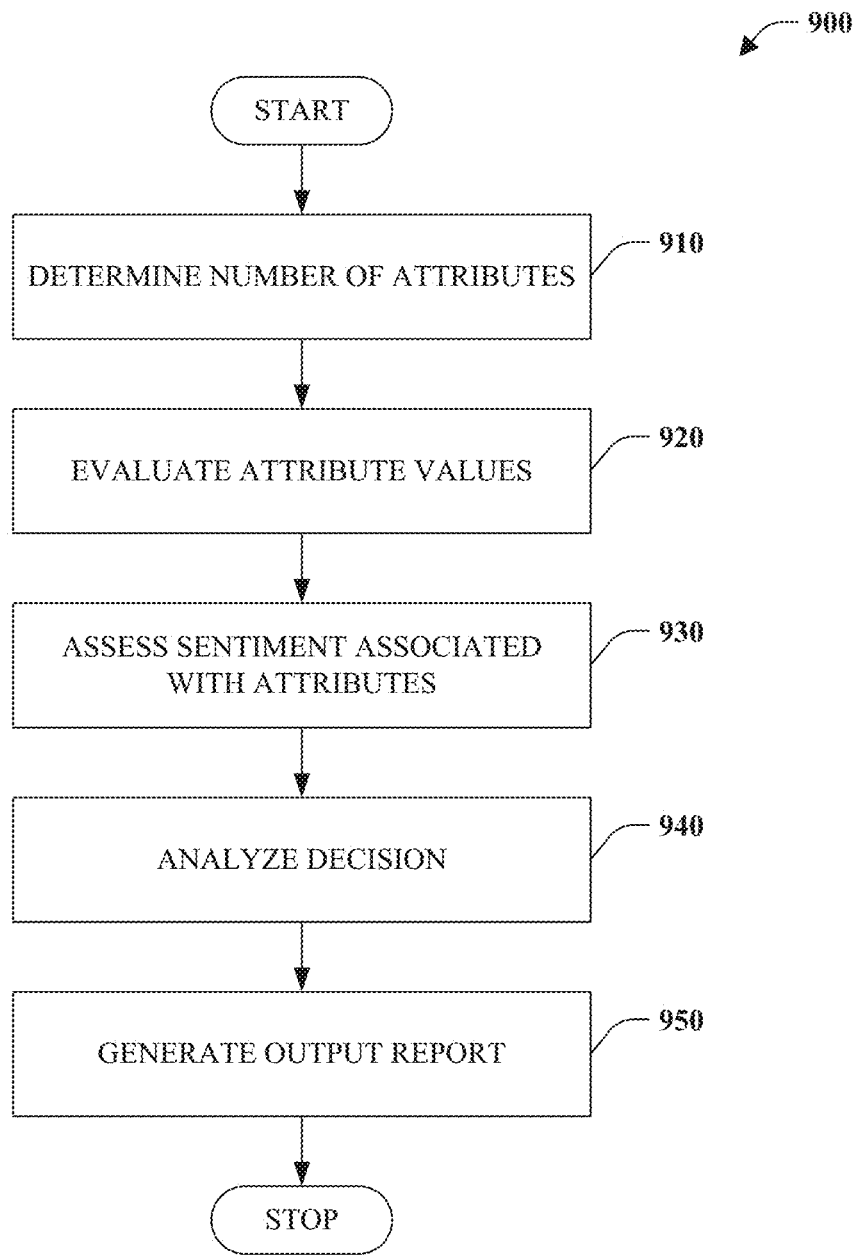
FIG. 9 is a flow chart diagram of a method of analyzing unstructured data.

In view of the exemplary systems described above, methods that may be implemented in accordance with the disclosed subject matter will be better appreciated with reference to flow chart diagrams of FIGS. 7-9. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 7 illustrates a method 700 of data interpretation analysis. The method 700 can be executed by the data interpretation analysis system 100 or portions thereof. At reference numeral 710, unstructured data is received that captures a data interpretation. The data interpretation can correspond to a comment regarding a loan or insurance policy, for example regarding approval. Other examples of data interpretation are also possible and contemplated. As an additional example consider interpretation of patient data in the context of treatment or clinical trials.

At 720, the unstructured data is converted into structured data. For example, natural language and text processing can be performed to determine and apply structure to the unstructured data. For example, words or phrases can be classified with a tag and corresponding sentiment determined. In accordance with one embodiment, attributes, such as credit attributes, can be identified in the unstructured data by way of text analysis and pattern matching such as through use of regular expressions. Subsequently, text surrounding identified attributes can be analyzed to determine sentiment, or attitude regarding the attribute, such as positive, negative, or neutral. For example, a high debt to income ratio can be determined to be a negative sentiment, while a large disposable income may be a positive sentiment with respect to a loan application.

At 730, the structured data is analyzed in view of other structured data to determine accuracy or correctness of the data interpretation. For example, in the context of a loan, an underwriter comment associated with approving or denying a loan can be analyzed in view of structured data provided in a corresponding loan application. For example, attributes identified from the comment can be determined from the loan application and compared to determine validity or accuracy. In one instance, attributes determined from structured data of the loan application can be compared to thresholds that can capture sentiment, and this sentiment can be compared with the sentiment determined from comment attributes. Attribute sentiment can subsequently be compared to determine accuracy of the comment.

FIG. 8 is a flow chart diagram of a method 800 of assessing accuracy of unstructured data, which can be performed by components of the data interpretation analysis system 100 such as the validation component 230. At numeral 810, one or more attributes are extracted from structured data to facilitate assessing accuracy of the data captured by unstructured data. For example, attributes can be extracted from a loan or insurance application to evaluate the correctness of a decision justification in an unstructured comment. At 820, the sentiment associated with the attributes can be determined. In this case, the attributes can be evaluated with respect to predetermined thresholds establishing bases for classification of the attribute as a positive attribute or a negative attribute. For example, a disposable income attribute can be deemed positive if it is greater that one thousand dollars and negative if it is less than one thousand dollars. At numeral 830, the determined sentiment derived from structured data is compared to sentiment computed from unstructured data with respect to each attribute. A difference in sentiment associated with an attribute is indicative of an accuracy issue. Continuing with the previous example, if there is a difference in the sentiment associated with a disposable income attribute, the problem may be a misunderstanding or inaccurate computation of the disposable income by a writer of an unstructured comment, for instance. At 840, the result of the analysis or validation is output. In accordance with one instance, validity corresponds to a binary operation of either true or false. Accordingly, the output can either label the unstructured data, such as a comment, as valid or invalid. Alternatively, a numeric or alphabetic score can be output capturing a level of accuracy or correctness of the content of an unstructured comment.

FIG. 9 depicts a method 900 of analyzing unstructured data such as that of a comment associated with a decision. The method 900 can be implemented by the data interpretation analysis system 100 and more particularly validation component 230. At 910, the number or quantity of attributes within unstructured data is determined. Attributes can be identified by way of natural language process and text analysis techniques to perform pattern matching with respect to known attributes. After all attributes have been identified, a count is performed to determine a quantity of attributes in the unstructured data. There can be a predetermined number of attributes that corresponds to a complete analysis versus an incomplete analysis or varying degrees in between.

At 920, attribute values are evaluated. Some attributes can comprise value representing attribute extent. For example, disposable income may be a particular number specified or the result of a computation. Likewise, attributes that capture ratios, such as payment to income ratio, can be computed. Other attributes merely represent occurrence of an event such as bankruptcy. The value of attributes captured in unstructured data is evaluated with respect to the value of attributes as determined from structured or other data. In this manner, the accuracy of unstructured data, such as a comment, can be determined based on whether or not attribute values are correctly captured.

At 930, sentiment associated with attributes is assessed. Sentiment can be determined for all attributes in an unstructured data comment or other data interpretation. More specifically, sentiment analysis can be employed over comments to determined writer opinion or attitude toward an attribute. This can be accomplished by way of various classification technologies (e.g. machine learning, lexicon-based approach . . . ) that classify attributes as having positive, negative, or neutral sentiment based on analysis of the text surrounding the attributes. Sentiment associated attributes determined from structured data, such as a loan or insurance application, can also be determined. In this case, the sentiment can be computed based on one or more thresholds associated with attribute value. For example, the mere presence of a bankruptcy is linked to a negative sentiment. With respect to disposable income, if disposable income is greater than a threshold level such as one thousand dollars, the sentiment is positive otherwise the sentiment is negative. A comparison of the attribute sentiment from unstructured data can be compared with attribute sentiment computed from structured data. Any difference between attribute sentiments is evidence of a lack of accuracy.

At 940, a decision supported or justified by an unstructured data comment is analyzed. As noted above, sentiment can be determined for each attribute in an unstructured comment. The sentiment from each attribute can be combined to form an aggregate sentiment associated with an unstructured comment. For example, positive sentiment can be captured by a positive one and negative sentiment by a negative one for each attribute, which can be added together to produce an overall sentiment for the comment. A decision can then be compared to the sentiment associated with the comment to determine whether the decision and sentiment are consistent or inconsistent. For instance, if a loan application has been approved and the sentiment of an associated comment is negative or if the loan application has been denied yet the sentiment of a corresponding comment is positive, the decision can be subject to further scrutiny due to inconsistency between the decision and the comment.

At 950, an output report is generated. The output report can capture an overall quality of specified unstructured data in terms of completeness, accuracy, and consistency, for example. The output report can simply correspond to a numeric (e.g., 1-10, score or alphabetic letter (e.g., A-F) indicative of quality. Additionally or alternatively, supplemental information can be provided that supports the score, such as by identifying inaccuracies in an unstructured comment.

The data interpretation analysis system 100 and associated methods can be employed in various contexts. In accordance with one embodiment, the data interpretation analysis can be employed as a post processing mechanism. For example, approved loan applications can be analyzed to identify applications with low accuracy underwriter comments for risk mitigation. In another instance, declined loan applications can be analyzed to identify applications with low accuracy underwriter comments for a second level review to identify a miss opportunity for approval. In another embodiment, data interpretation analysis can be employed in training to educate underwriters to document comments in terms of completeness of attributes to bring standardization and consistency into the process, for example to meet regulatory guidelines.

Aspects of the subject disclosure concern the technical problem of analyzing data presented in an unstructured form. The problem is solved with technical processes associated with at least attribute extraction and sentiment analysis. More specifically, natural language processing, text analysis, pattern matching, and automatic classification by way of a machine learning or lexicon based approach can be employed to process unstructured data. After the unstructured data is processed, the data can be analyzed to determine for example quality of content such that data associated with low quality can be forwarded for further review.

The subject disclosure provides for various products and processes that perform, or are configured to perform risk assessment and mitigation associated with end-user computing tools. What follows are one or more exemplary systems and methods.

A system comprises a processor coupled to a memory that includes instructions that when executed by the processor cause the processor to: receive unstructured data that captures an interpretation of data, identify attributes in the unstructured data, determine sentiment of the attributes based on the unstructured data, and assess accuracy of the attributes and sentiment based on corresponding structured data subject to the interpretation. The system can further comprise instructions that cause the processor to receive the unstructured data from a comment field identifying one or more reasons an underwriter approved or denied an application for a loan. Instructions can further cause the processor to identify credit attributes, determine sentiment in terms of strength or risk, and perform patter recognition to identify the attributes. Further, an accuracy score can be computed that captures deviation of the attributes and sentiment from the corresponding structured data, and in one instance the structured data can be acquired from an application. The system further comprises instructions that cause the processor to flag the unstructured data for further review when the accuracy score falls below a predetermined acceptable-accuracy threshold. In addition, instructions can cause the processor to determine a quantity of attributes present in the unstructured data and generate a completeness score based on comparison with a predetermined threshold quantity of attributes. The system can further comprise instructions that cause the processor to compute overall sentiment from the sentiment associated with each attribute and compare the overall sentiment with a judgement to assess the judgement in terms of consistency with the overall sentiment.

A method comprises executing, on a processor, instructions that cause the processor to perform operations comprising: receiving unstructured data capturing an interpretation of data, identifying attributes in the unstructured data, determining sentiment of the attributes based on the unstructured data, and assessing validity of the attributes and sentiment based on corresponding structured data. The method further comprises generating an accuracy score that captures deviation of the attributes and sentiment in comparison to corresponding attributes determined from structured data, and flagging the unstructured data for quality assurance review when the accuracy score satisfies a predetermined threshold for quality assurance review. The method further comprises determining a quantity of attributes present in the unstructured data and generating a completeness score based on comparison of the quantity of attributes present with a predetermined threshold quantity of attributes. Further, method operations can comprises employing machine-learning-based text mining to identify the attributes in the unstructured data, and employing supervised pattern recognition to identify patterns in the unstructured data.

A method comprises executing, on a processor, instructions that cause the processor to perform operations comprising: receiving an unstructured text comment of an underwriter justifying approval or denial of a loan application, text mining the comment for credit attributes, determining sentiment associated with the credit attributes from the comment, and validating correctness of the credit attributes and the sentiment based on structured data from the loan application. In one instance determining the sentiment can comprise classifying the credit attributes in terms of risk of default. The method can further comprise generating an accuracy score indicative of the correctness based on a comparison of the sentiment of the credit attributes with structured counterparts in the loan application. Further, the method can include operations comprising: determining a number of credit attributes in the comment, comparing the number of credit attributes to a predetermined threshold, and generating a completeness score based a result of the comparing.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

To provide a context for the disclosed subject matter, FIG. 8 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

Figure 10:
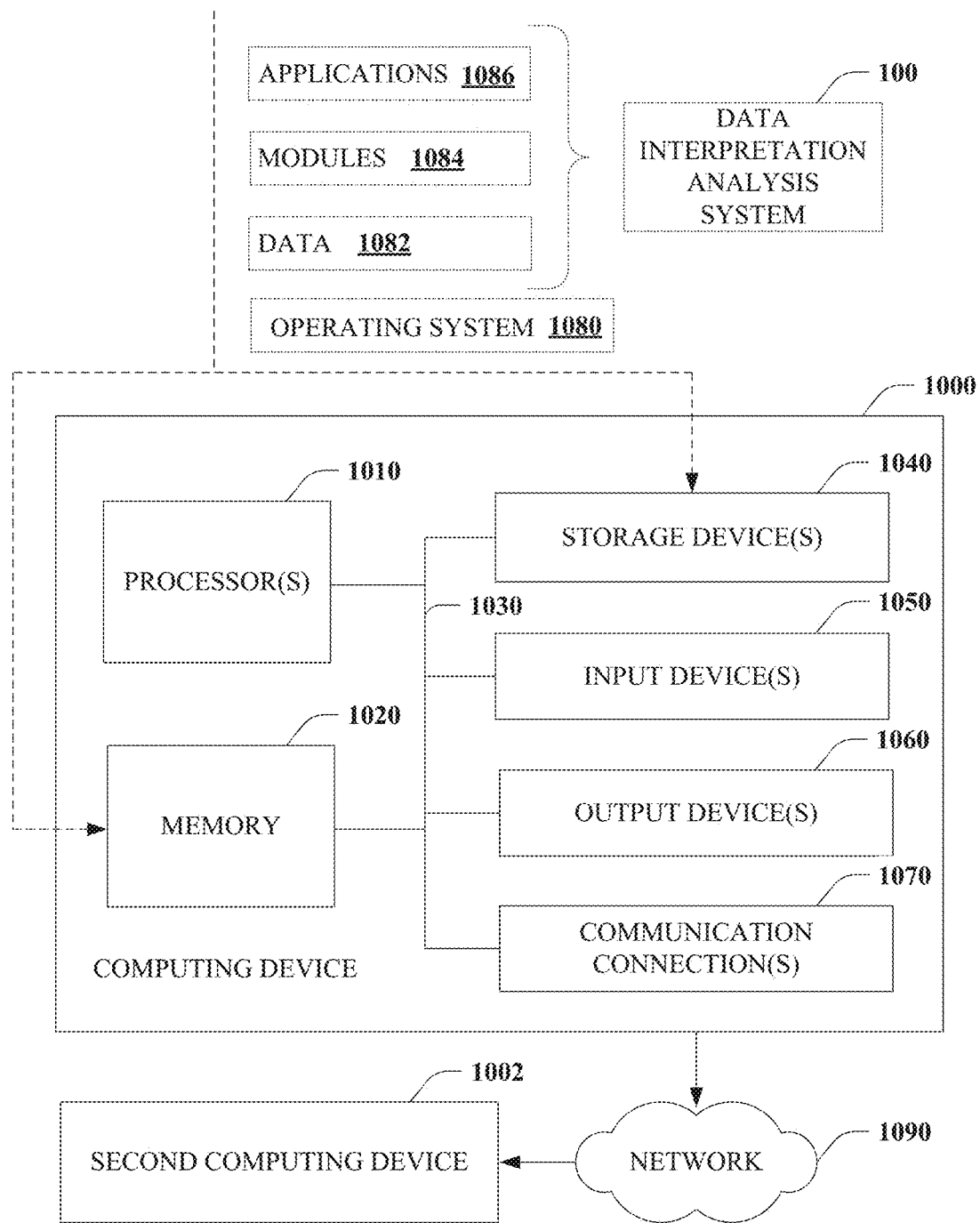
FIG. 10 is a schematic block diagram illustrating a suitable operating environment for aspects of the subject disclosure.

With reference to FIG. 10, illustrated is an example computing device 1000 (e.g., desktop, laptop, tablet, watch, server, hand-held, programmable consumer or industrial electronics, set-top box, game system, compute node . . . ). The computing device 1000 includes one or more processor(s) 1010, memory 1020, system bus 1030, storage device(s) 1040, input device(s) 1050, output device(s) 1060, and communications connection(s) 1070. The system bus 1030 communicatively couples at least the above system constituents. However, the computing device 1000, in its simplest form, can include one or more processors 1010 coupled to memory 1020, wherein the one or more processors 1010 execute various computer executable actions, instructions, and or components stored in the memory 1020.

The processor(s) 1010 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1010 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1010 can be a graphics processor unit (GPU) that performs calculations with respect to digital image processing and computer graphics.

The computing device 1000 can include or otherwise interact with a variety of computer-readable media to facilitate control of the computing device to implement one or more aspects of the disclosed subject matter. The computer-readable media can be any available media that accessible to the computing device 1000 and includes volatile and non-volatile media, and removable and non-removable media. Computer-readable media can comprise two distinct and mutually exclusive types, namely storage media and communication media.

Storage media includes volatile and nonvolatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 1000. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 1020 and storage device(s) 1040 are examples of computer-readable storage media. Depending on the configuration and type of computing device, the memory 1020 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 1000, such as during start-up, can be stored in nonvolatile memory, while volatile memory can act as external cache memory to facilitate processing by the processor(s) 1010, among other things.

The storage device(s) 1040 include removable/non-removable, volatile/non-volatile storage media for storage of vast amounts of data relative to the memory 1020. For example, storage device(s) 1040 include, but are not limited to, one or more devices such as a magnetic or optical disk drive, floppy disk drive, flash memory, solid-state drive, or memory stick.

Memory 1020 and storage device(s) 1040 can include, or have stored therein, operating system 1080, one or more applications 1086, one or more program modules 1084, and data 1082. The operating system 1080 acts to control and allocate resources of the computing device 1000. Applications 1086 include one or both of system and application software and can exploit management of resources by the operating system 1080 through program modules 1084 and data 1082 stored in the memory 1020 and/or storage device(s) 1040 to perform one or more actions. Accordingly, applications 1086 can turn a general-purpose computer 1000 into a specialized machine in accordance with the logic provided thereby.

All or portions of the disclosed subject matter can be implemented using standard programming and/or engineering techniques to produce software, firmware, hardware, or any combination thereof to control the computing device 1000 to realize the disclosed functionality. By way of example and not limitation, all or portions of the data interpretation analysis system 100 can be, or form part of, the application 1086, and include one or more modules 1084 and data 1082 stored in memory and/or storage device(s) 1040 whose functionality can be realized when executed by one or more processor(s) 1010.

In accordance with one particular embodiment, the processor(s) 1010 can correspond to a system on a chip (SOC) or like architecture including, or in other words integrating, both hardware and software on a single integrated circuit substrate. Here, the processor(s) 1010 can include one or more processors as well as memory at least similar to the processor(s) 1010 and memory 1020, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the data interpretation analysis system 100 and/or functionality associated therewith can be embedded within hardware in a SOC architecture.

The input device(s) 1050 and output device(s) 1060 can be communicatively coupled to the computing device 1000. By way of example, the input device(s) 1050 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 1060, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1050 and output device(s) 1060 can be connected to the computing device 1000 by way of wired connection (e.g., bus), wireless connection (e.g., Wi-Fi, Bluetooth . . . ), or a combination thereof.

The computing device 1000 can also include communication connection(s) 1070 to enable communication with at least a second computing device 1002 by means of a network 1090. The communication connection(s) 1070 can include wired or wireless communication mechanisms to support network communication. The network 1090 can correspond to a local area network (LAN) or a wide area network (WAN) such as the Internet. The second computing device 1002 can be another processor-based device with which the computing device 1000 can interact.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
   a processor coupled to a memory that includes instructions that when executed by the processor cause the processor to:
   receive unstructured data that captures an interpretation of data, wherein the unstructured data is received from a comment field identifying one or more reasons an underwriter approved or denied an application for a loan;
   identify attributes in the unstructured data;
   determine sentiment of the attributes based on the unstructured data; and
   assess accuracy of the attributes and sentiment based on corresponding structured data subject to the interpretation.

2. The system of claim 1, further comprising instructions that cause the processor to identify credit attributes.

3. The system of claim 1, further comprising instructions that cause the processor to determine the sentiment in terms of attribute strength or risk.

4. The system of claim 1, further comprising instructions that cause the processor to perform pattern recognition to identify the attributes.

5. The system of claim 1, further comprising instructions that cause the processor to compute an accuracy score that captures deviation of the attributes and sentiment from the structured data.

6. The system of claim 5, further comprising instructions that cause the processor to compute the accuracy score based on a number of attributes and associated sentiment that match attributes computed from structured data from an application.

7. The system of claim 6, further comprising instructions that cause the processor to flag the unstructured data for further review when the accuracy score falls below a predetermined acceptable-accuracy threshold.

8. The system of claim 1, further comprising instructions that cause the processor to determine a quantity of attributes present in the unstructured data and generate a completeness score based on comparison with a predetermined threshold quantity of attributes.

9. The system of claim 1, further comprising instructions that cause the processor to compute an overall sentiment from the sentiment associated with each attribute and compare the overall sentiment with a judgement to assess the judgement in terms of consistency with the overall sentiment.

10. A method, comprising:
    executing, on a processor, instructions that cause the processor to perform operations comprising:
    receiving unstructured data capturing an interpretation of data;
    identifying attributes in the unstructured data;
    determining sentiment of the attributes based on the unstructured data;
    generating an accuracy score that captures deviation of the attributes and sentiment in comparison to corresponding attributes determined from structured data; and
    assessing validity of the attributes and sentiment based on structured data.

11. The method of claim 10, wherein the operations further comprise flagging the unstructured data for quality assurance review when the accuracy score satisfies a predetermined threshold.

12. The method of claim 10, wherein the operations further comprise determining a quantity of attributes present in the unstructured data and generating a completeness score based on comparison of the quantity of attributes present with a predetermined threshold quantity of attributes.

13. The method of claim 10, wherein the operations further comprise employing machine-learning-based text mining to identify the attributes in the unstructured data.

14. The method of claim 10, wherein the operations further comprise employing supervised pattern recognition to identify patterns in the unstructured data.

15. A method, comprising:
    executing, on a processor, instructions that cause the processor to perform operations comprising:
    receiving an unstructured text comment of an underwriter justifying approval or denial of a loan application;
    text mining the comment for credit attributes;
    determining sentiment associated with the credit attributes from the comment; and
    validating correctness of the credit attributes and the sentiment based on structured data from the loan application.

16. The method of claim 15, wherein determining the sentiment comprises classifying the credit attributes in terms of risk of default.

17. The method of claim 15, further comprising executing, on the processor, instructions that cause the processor to perform an operation comprising generating an accuracy score indicative of the correctness based on a comparison of the sentiment of the credit attributes with structured counterparts in the loan application.

18. The method of claim 17, further comprising executing, on the processor, instructions that cause the processor to perform operations comprising:
- determining a number of credit attributes in the comment;
- comparing the number of credit attributes to a predetermined threshold; and
- generating a completeness score based a result of the comparing.

\* \* \* \* \*

UNITED STATES PATENT AND TRADEMARK OFFICE
CERTIFICATE OF CORRECTION

| | |
|---|---|
| PATENT NO. | : 11,574,150 B1 |
| APPLICATION NO. | : 16/687198 |
| DATED | : February 7, 2023 |
| INVENTOR(S) | : Pranshu Sharma et al. |

It is certified that error appears in the above-identified patent and that said Letters Patent is hereby corrected as shown below:

In the Claims

Column 15, Line 61, replace "corresponding structured data subject to the interpre-" with -- structured data subject to the interpre- --.

Signed and Sealed this
Eleventh Day of April, 2023

Katherine Kelly Vidal
*Director of the United States Patent and Trademark Office*